United States Patent [19]
Hamilton

[11] 3,902,605
[45] Sept. 2, 1975

[54] SUCTION LIFTING APPARATUS
[75] Inventor: Haldon L. Hamilton, Crescent City, Calif.
[73] Assignee: Hambro Forest Products, Inc., Crescent City, Calif.
[22] Filed: Nov. 9, 1972
[21] Appl. No.: 305,070

[52] U.S. Cl. ............. 214/1 BT; 214/658; 294/64 A
[51] Int. Cl............................................. B23q 7/04
[58] Field of Search... 214/1 BS, 1 BT, 1 BH, 1 BV, 214/650 SG, 658; 294/64, 64 A

[56] References Cited
UNITED STATES PATENTS

| | | | |
|---|---|---|---|
| 2,280,658 | 4/1942 | Miller | 294/64 A |
| 3,181,563 | 5/1965 | Giffen | 294/64 A |
| 3,425,736 | 2/1969 | Benjamin | 294/64 R |

FOREIGN PATENTS OR APPLICATIONS

| 954,315 | 4/1964 | United Kingdom | 294/64 R |
|---|---|---|---|

Primary Examiner—Frank E. Werner
Assistant Examiner—George F. Abraham
Attorney, Agent, or Firm—Kolisch, Hartwell, Dickinson & Stuart

[57] ABSTRACT

Suction lifting apparatus wherein a multidirectionally movable suction cup depends from a hoist. Producing suction in this cup is an air-flow system including a Venturi device mounted adjacent the cup, a rigid loop-shaped conduit which extends from the Venturi device toward a bend in the conduit spaced to one side of the cup, and a flexible conduit connected above the cup to an end of the rigid conduit. A valve mounted near the bend in the rigid conduit controls air flow in the system. The rigid conduit serves, additionally, as a convenient handle for manipulating the cup.

5 Claims, 4 Drawing Figures

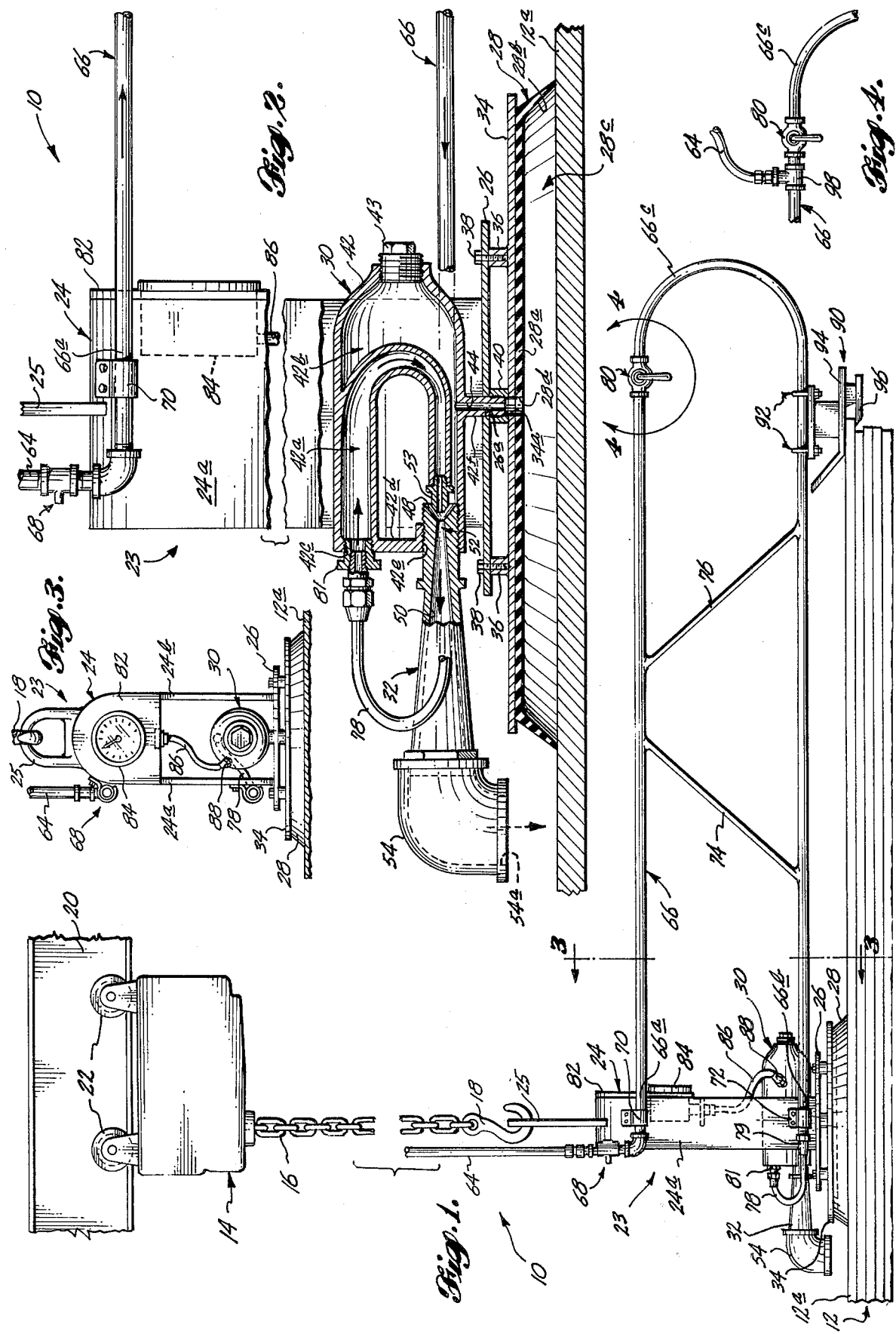

SUCTION LIFTING APPARATUS

BACKGROUND AND SUMMARY OF THE INVENTION

This invention pertains to suction-type lifting apparatus. More particularly, it pertains to such apparatus which is especially adapted for lifting and handling (in a generally horizontal position) panel-like articles, such as plywood or particle-board, as well as various more-or-less planar composite structures incorporating such materials.

In apparatus for lifting and handling articles such as those just mentioned, maneuverability, and speed and simplicity of operation, are important considerations.

A general object of the present invention is to provide suction-type lifting apparatus suitable for the purpose just mentioned, and characterized both by a high degree of maneuverability, and by outstanding speed and simplicity of operation.

A related object is to provide such apparatus which is relatively lightweight and compact in construction, and which further is extremely easy and convenient to manipulate.

According to a preferred embodiment of the invention, a suction cup is mounted on a bracket which is attached to a chain or a cable extending downwardly from an overhead hoist. The hoist may be actuated to raise and lower the cup, and may conveniently be mounted on a suitable overhead track system for lateral movement in different directions. Suction in the cup is produced preferably by a Venturi device which is mounted adjacent the cup, with air supplied this Venturi device through a conduit system connecting with any suitable supply of pressurized air. Further, according to the invention, the conduit system just mentioned includes an elongated rigid loop, which extends laterally of the suction cup, and conveniently serves as a handle for manipulating the cup. The exact length of this loop is a matter of choice, but typically is made long enough to enable easy handling of the cup from any side of the largest article expected to be picked up. A valve is mounted in the loop, preferably adjacent the bend therein, for controlling the flow of air to the Venturi device.

Another feature of the invention is that an air-flow exhaust pipe, having a downwardly facing exhaust port, communicates with the outlet of the Venturi device, with such port disposed closely adjacent the downwardly facing mouth of the suction cup. With air flowing in the system, air exhausting from this port blows away any dirt, grit, or the like which may have accumulated on the surface of an article about to be engaged by the suction cup—thus promoting good sealing between the mouth of the cup and the article.

It will be apparent that with apparatus constructed as just generally outlined, a relatively simple and lightweight, and highly maneuverable lifting apparatus is provided. Contributing to lightness of weight in the apparatus is the fact that pressurized air and a Venturi device are employed to produce suction in the suction cup, rather than a vacuum pumping system which is typically quite heavy and bulky. Lightness of weight is, of course, one of the factors enhancing maneuverability of the apparatus. Also contributing to maneuverability is the fact that the air-flow system includes an elongated laterally extending rigid conduit which acts as a handle for manipulating the suction cup. Further, of course, is the fact that the suction cup and handle depend from a hoist which enables ready shifting of the position of the cup.

DESCRIPTION OF THE DRAWINGS

These and other objects and advantages attained by the invention will become more fully apparent as the description which follows is read is conjunction with the accompanying drawings, wherein:

FIG. 1 is a fragmentary side elevation illustrating a preferred embodiment of suction lifting apparatus constructed according to the present invention;

FIG. 2 is an enlarged view, with portions broken away, illustrating details of construction of a suction cup, Venturi device, and an air exhaust assembly contained in the apparatus of FIG. 1;

FIG. 3 is a view, on about the same scale as FIG. 1, taken generally along the line 3—3 in FIG. 1; and FIG. 4 is a fragmentary detail view illustrating a modification which may be made in that area of the apparatus in FIG. 1 contained within curved line 4—4 in FIG. 1.

DETAILED DESCRIPTION OF THE INVENTION

Turning now to the drawings, and referring first to FIG. 1, indicated generally at 10 is a suction lifting apparatus constructed according to the present invention. Apparatus 10 herein is located within a building (not illustrated) which contains, among other things, a stack of plywood panels, shown partially at 12, from which individual panels are to be picked up and handled by the apparatus. Apparatus 10 is shown in FIG. 1 in a position properly disposed over stack 12 to pick up the top panel 12a in the stack.

Included in the lifting apparatus is a conventional overhead hoist 14 including an elongated downwardly extending chain, or lift element, 16 which may be taken up and payed out selectively under power by operating the usual hoist motor included in the hoist. The lower end of chain 16 carries a hook 18. While different kinds of mountings may be provided the hoist, hoist 14 herein is mounted for movement back and forth along an elongated I-beam rail 20—the hoist being supported on the lower flange of this rail through rollers, such as the rollers shown at 22. Rail 20 is substantially horizontal, and accommodates movement of the hoist to the left and to the right therealong in FIG. 1. Suitable power-operated drive means are provided for so moving the hoist. Rail 20 herein is suitably mounted for back and forth movement under power in directions into and out of the plane of FIG. 1. This mounting for the rail is entirely conventional.

Suspended from hook 18, as contemplated herein, is a bracket structure 23 which carries other parts in the lifting apparatus. Bracket structure 23 includes an upper generally inverted-U-shaped bracket 25 which engages hook 18, and a lower generally inverted U-shaped bracket 24 joined to bracket 25. Bracket 24 includes laterally-spaced downwardly extending legs 24a, 24b which are joined to and carry a substantially horizontal circular plate 26 in the bracket structure. Plate 26 includes a central axial bore 26a.

Mounted on plate 26, as will now be described, are a suction cup, or suction device, 28, a vacuum bottle 30 and a Venturi device, or Venturi means, 32.

Cup 28 is a conventional, generally circular, dish-shaped suction cup formed of a suitable resilient material, such as a suitable synthetic rubber material. The suction cup includes a flat circular central web 28a, the circumferential margin of which joins with a downwardly and outwardly flaring rim 28b—these two portions defining a downwardly facing mouth 28c. Provided in web 28a is a central axial passage 28d. Cup 28 is suitably mounted on the underside of a flat circular support plate 34, which in turn is secured below the underside of plate 28 through multiple standoffs, such as standoffs 36, which extend between plates 26, 34, and screws, such as those shown at 38. Plate 34 is provided with a central axial bore 34a which is axially aligned with passage 28d. A central tubular standoff 40 is joined to the top of plate 34, and extends between this plate and plate 26. The axial bore is standoff 40 communicates with bores 26a, 34a.

Vacuum bottle 30, which is positioned above plate 26 and between bracket legs 24a, 24b, has the internal construction and configuration clearly shown in FIG. 2. Generally speaking, the vacuum bottle includes a housing 42 divided into two chambers which may be thought of as an air inlet chamber 42a and a vacuum chamber 42b. The air inlet chamber is generally U-shaped. Its upper end in FIG. 2 communicates with a bore 42c provided in the left end wall 42d of housing 42. The lower end of the air inlet chamber faces a bore 42e provided in the left end wall of housing 42. Formed integrally with the underside of housing 42 in FIG. 2 is a downwardly extending nipple 42f which includes an axial bore 44. Bottle 30 is supported in place through nipple 42f which extends through bore 26a and is screwed into the axial bore of standoff 40. A plug 43 closes the right end of housing 42 in FIG. 2.

Venturi device 32 has the axial cross-sectional configuration illustrated in FIG. 2, and includes an elongated axial passage extending through it formed from two adjacent and communicating truncated conical passage sections, including an inner passage section 48, and an outer passage section 50. As can be seen, these two passage sections diverge toward the opposite ends of the device 32 from their point of intersection, indicated generally at 52, which point is known as the throat of the Venturi device. The right end of device 32 in FIG. 2, is screwed into bore 42e. A nozzle 53 faces and extends into passage section 48 as shown—this nozzle being screwed into the lower end of air inlet chamber 42a. With nozzle 53 and device 32 disposed as shown, it will be noted that passage section 48 communicates both with the central axial bore in the nozzle, and with vacuum chamber 42b.

Suitably mounted on the left end of device 32 in FIG. 2 is a right-angle pipe elbow, or exhaust means, 54. Elbow 54 includes a downwardly facing port 54a whose function herein will be explained shortly. It will be noted that port 54a is disposed to the left in FIG. 2 of cup 28.

According to this invention, suction in cup 28 is produced by air under pressure which is supplied from any suitable external source to the Venturi device. Such air is supplied herein through an air-flow system which includes an elongated flexible conduit 64 and a rigid loop-shaped conduit 66. The upper end of conduit 64 in the figures, which end is shown broken off, extends in any suitable manner to the external source of pressurized air just mentioned. The lower end of this conduit in the figures connects through a fitting assembly 68 to the upper end of rigid conduit 66 in the figures.

As can be seen clearly in FIG. 1, conduit 66, which is shown as a unitary conduit, has its upper and lower ends 66a, 66b, respectively, mounted through fasteners 70, 72, respectively, to the outside of leg 24a in bracket 24. From these ends, conduit 66 extends to the right in FIG. 1 toward a bend 66c therein which, it will be noted, extends beyond the right side of pile 12 in FIG. 1. Diagonal stiffening braces 74, 76 extend as shown between the upper and lower reaches of conduit 66. For certain applications it might be desirable to form conduit 66 from multiple conduit sections.

A conduit 78 interconnects conduit 66 and the upper end of air inlet chamber 42a. More specifically, one end of conduit 78 connects with conduit end 66b through a fitting 79, and the other end of conduit 78 connects with the upper end of the air inlet chamber through a fitting 81.

Referring particularly to FIG. 1, a control value 80 for allowing or blocking the flow of air in conduit 66 is provided adjacent the top of bend 66c in the conduit.

Mounted on a plate 82 which is suitably attached to the right upper side of bracket 24 in FIGS. 1 and 2, is a conventional vacuum gauge 84. This vacuum gauge is connected through a hose 86 and a fitting 88 with the inside of chamber 42b (see FIGS. 1 and 3). Gauge 84 is thus connected to follow the level of vacuum established in chamber 42b.

Completing a description of the preferred embodiment of the invention, releasably secured to the lower stretch of conduit 66, inwardly from bend 66c, is a guide and panel-release assembly 90. This assembly is clamped to conduit 66 by a pair of U-bolt assemblies 92. Assembly 90 includes an upper angular guide plate 94 spaced below the bottom side of which is mounted a panel-release finger 96. The way in which these elements perform will be described shortly.

It will be observed that in the form of the invention just described, air under pressure is introduced into the air-flow system through conduit 64 which, in this case, extends upwardly in the lift apparatus generally along chain 16. While such a location for conduit 64 is preferred in most instances, there are some applications where it is deemed convenient to attach conduit 64 as shown in FIG. 4. In this case, it will be seen that conduit 64 connects with conduit 66 through a T-fitting 98 which is disposed immediately adjacent and to the left of valve 80. Under such circumstances, upper end 66a of conduit 66 would still be attached to bracket leg 24a, but would be closed off by a suitable plug (not shown).

Explaining now how apparatus 10 may be used, initially, assembly 90 is positioned and secured along the lower reach of conduit 66 in such a position that plate 94 will engage the near edge of a panel which is about to be picked up, with cup 28 then substantially centered between this edge and the opposite edge of the panel. For example, in an operation where 4 × 8 feet sheets of plywood are to be handled, with the operator working from an end side of a stack of such sheets, assembly 90 will be positioned along conduit 66 about 4 feet from the axis of cup 28. Assembly 90 is shown in such a position in FIG. 1.

One of the very important features of the invention is that rigid conduit 66, in addition to functioning as a portion of the air-flow system in the apparatus, also functions as the principal handle through which an operator can readily manipulate the position and attitude of the suction cup. Under normal circumstances, an operator using apparatus 10 will work adjacent bend 66c, where he can easily grasp various portions of conduit 66, and can also adjust control valve 80.

When it is desired, for example, to pick up top panel 12a in pile 12, the operator, manipulating cup 28 through handling of conduit 66, shifts the cup to a substantially centered position over panel 12a, with assembly 90 engaging the near (right) edge of panel 12a as shown in FIG. 1. Such positioning of the cup is done with the cup elevated a slight distance above the panel, such elevation being accomplished simply by operating the hoist motor in hoist 14 to take up chain 16 a sufficient amount. Regarding the position of assembly 90 relative to panel 12a, preferably the panel is shifted slightly on the pile toward the operator so that finger 96 can be placed beneath the panel's near edge (as shown in FIG. 1). With the cup centered over the panel, the hoist chain is then lowered to place the mouth of the cup against the panel.

With valve 80 open, and air flowing in the air-flow system during the operation just described, as the apparatus is shifted over panel 12a, air exhausting from port 54a blows away any dust and grime, etc., which may have collected on top of the panel. Such action facilitates good contact between the panel and the mouth of the cup, and is another important advantage of the present invention.

After lowering of the cup as just mentioned, and with air flowing in the air-flow system as described, contact between the mouth of the cup and the panel results in the cup gripping the panel, with suction developed in the cup from vacuum chamber 42b. A vacuum condition in chamber 42b, of course, results from the fact that air flows, as indicated by the arrows in FIG. 2, through Venturi device 32. The Venturi device functions in a conventional manner to generate this vacuum condition. The exact air-flow conditions which are required in the system to handle panels of different sizes and weights can easily be determined. Gauge 84 aids in determining when a sufficient gripping force has been established.

With the cup gripping the top of panel 12a, and with assembly 90 positioned as shown, the operator then lifts up on conduit 66 (adjacent bend 66c) with finger 96 then lifting up the edge of the panel to break any slight vacuum condition which might exist between panel 12a and the panel beneath it. On breaking of any such vacuum condition between these panels, the operator then again actuates the hoist motor, this time to take up chain 16 the desired amount to pick the panel up off the pile.

Shifting of the lifted panel to the desired location in the building is easily accomplished by maneuvering the position of the hoist in the usual manner, while at the same time controlling movement and attitude in the panel through manipulating conduit 66. It will be evident that good control over panel movement and attitude is easily attained in such a manner.

When the panel has been shifted to where it is to be set down, the operator, stabilizing movement in the panel through handling conduit 66, lowers the panel by operating the hoist motor to pay out chain 16. When the panel has been thus set down, the operator closes valve 80 to cut off the supply of air to the Venturi device, thus to release the panel from the suction cup.

It will thus be seen that apparatus constructed in accordance with the present invention indeed offers the various features and advantages ascribed to it earlier. With rigid conduit 66 shaped and disposed as described herein, manipulation of the position of the suction cup, and manipulation of any load held by the cup, are relatively easily accomplished. This rigid conduit may, of course, be constructed to have different lengths to take care of different load-handling situations. Good gripping between the cup and a load is promoted by the dust-clearing operation performed by exhaust port 54a.

It will further be evident that the various parts in the apparatus which are suspended from chain 16 may be (and preferably are) relatively light-weight. Thus, manipulation of their positions through handling conduit 66 can be accomplished with little effort.

While a preferred embodiment, and certain modifications, of the invention have been set forth herein, it is appreciated that other variations and modifications may be made without departing from the spirit of the invention.

It is claimed and desired to secure by letters patent:
1. Suction lifting apparatus comprising
    a hoist,
    a suction device mounted for movement on said hoist having a downwardly facing mouth, and
    an elongated rigid handle fastened to and extending to one side of said device for manipulating the same,
    said handle comprising a conduit forming part of an air-flow system which connects with said suction device to produce suction therein said air-flow system further including Venturi means connected to said conduit and supplied air by the conduit whereby to produce a suction, and exhaust means connected to said Venturi means including a downwardly facing exhaust port disposed adjacent said mouth of said suction device.
2. Suction lifting apparatus comprising
    a movable suction device
    an elongated flexible air-flow conduit having an end disposed closely adjacent said device, and
    means operatively interconnecting said end and said suction device cooperating with said flexible conduit to produce suction in the suction device, said means including Venturi means and an elongated, rigid, generally loop-shaped conduit operatively connected to said Venturi means,
    said rigid conduit being fastened to, and extending to one side of, said suction device and forming a handle for manipulating the device.
3. The apparatus of claim 2, which is adapted for mounting on a hoist.
4. Suction lifting apparatus comprising
    a hoist including an elongated, depending, multidirectionally movable lift element,
    a bracket attached to said lift element,
    a suction device mounted on said bracket,
    an air-flow system for producing suction in the suction device, said air-flow system including an elongated, rigid, generally loop-shaped conduit having ends mounted on said bracket and extending from said ends toward a bend in the conduit spaced to one side of said suction device, and an elongated flexible conduit connected to said rigid conduit at a point upstream thereon from said suction device, and
    Venturi means operatively interposed between said rigid conduit and said suction device.
5. The apparatus of claim 4, wherein said air-flow system further includes a valve mounted on said rigid conduit adjacent said bend and downstream from said flexible conduit for controlling air flow in the system.

* * * * *